Figure 1:
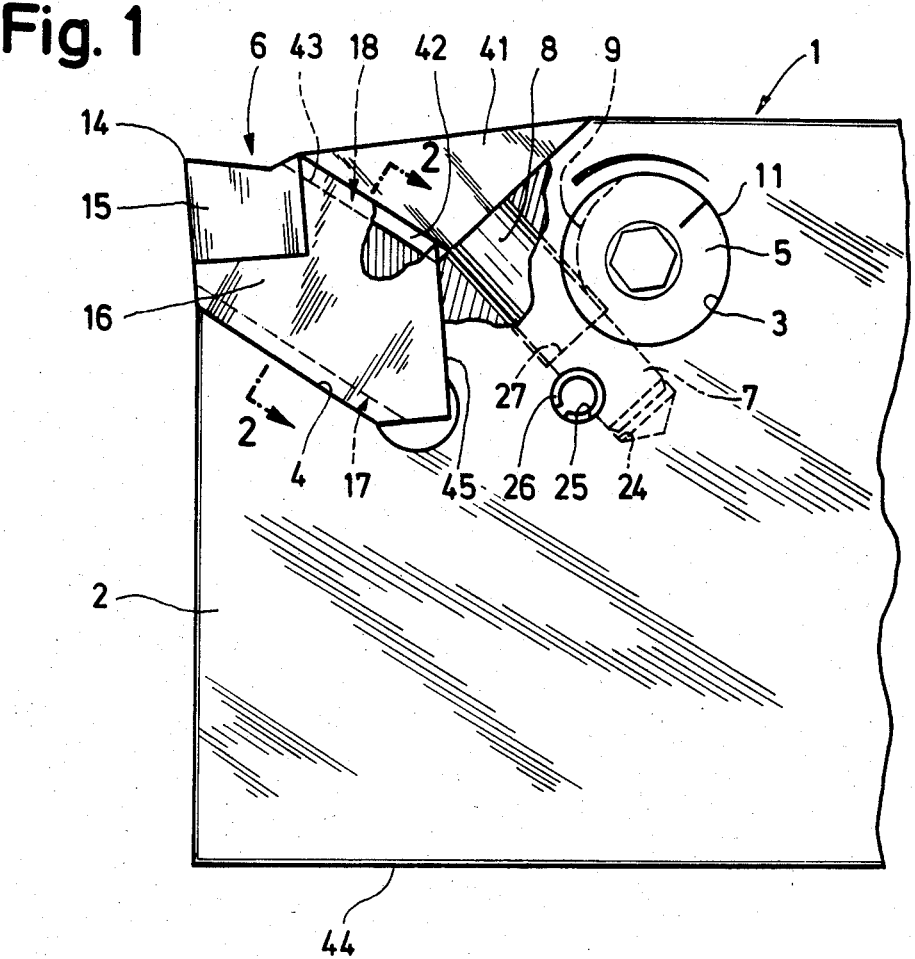

United States Patent [19]
Keller

[11] Patent Number: 4,645,385
[45] Date of Patent: Feb. 24, 1987

[54] DEVICE FOR CLAMPING CUTTING INSERTS

[76] Inventor: Werner Keller, Im Krötenteich 2, 6967 Buchen, Fed. Rep. of Germany

[21] Appl. No.: 714,105

[22] Filed: Mar. 20, 1985

[30] Foreign Application Priority Data

Mar. 23, 1984 [DE] Fed. Rep. of Germany ....... 3410779

[51] Int. Cl.⁴ .......................... B26D 1/00; B23B 29/12
[52] U.S. Cl. ................................. 407/105; 407/117
[58] Field of Search ............... 407/105, 104, 103, 108, 407/111, 117

[56] References Cited

U.S. PATENT DOCUMENTS 3,500,522  3/1970  Stier ..................................... 407/111
4,011,050  3/1977  Zinner ................................. 407/117
4,195,956  4/1980  Mihic ................................... 407/117

FOREIGN PATENT DOCUMENTS 1047240  1/1979  Canada ................................ 407/111
2647546  4/1978  Fed. Rep. of Germany ...... 407/117
3319799  6/1984  Fed. Rep. of Germany .

Primary Examiner—Leonidas Vlachos
Attorney, Agent, or Firm—Leydig, Voit & Mayer

[57] ABSTRACT

The invention relates to a device for clamping cutting inserts in recesses of cutter supports comprising a cam rotatably mounted in the cutter support and a clamping member provided on the cutter support. The clamping member is adapted to be pressed by the cam against the cutting insert and is designed as a pin secured in the cutter support in a cantilever manner. The free end of the pin is adapted to be displaced by the cam towards the cutting insert. In order to improve the run-off of cuttings, a clamping plate engaging the cutting insert is provided on the free end of the pin.

2 Claims, 2 Drawing Figures

U.S. Patent  Feb. 24, 1987  4,645,385

4,645,385

DEVICE FOR CLAMPING CUTTING INSERTS

The invention relates to a device for clamping cutting inserts in recesses of cutter supports comprising a cam rotatably mounted in the cutter support and a clamping member provided on the cutter support and adapted to be pressed against the cutting insert by the cam, the clamping member being designed as a pin secured in a cantilever manner in the cutter support, the free end of this pin being displaceable towards the cutting insert by the cam.

In a device of this type disclosed in an earlier proposal (German laid-open application No. 33 19 799) difficulties may arise with the run-off of cuttings or chippings resulting from trimming or cutting operations. In addition, the cutter support has to be very broad in design, in relation to the cutting insert, due to the arrangement of the cam.

The object underlying the invention is to improve a device of the type in question such that an advantageous run - off of cuttings is ensured when the cutter support is of a narrow design and, in particular, that no cuttings become caught or jammed between the pin and the cutter plate.

This object is accomplished according to the invention in that a clamping plate engaging the cutting insert is arranged at the free end of the pin and the adjacent sides of cutting insert and clamping plate can be designed to be complementary to one another and engage one another positively and substantially without clearance.

Figure 2:
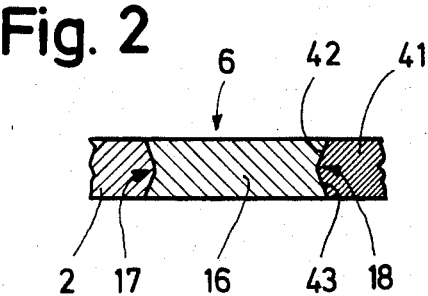

The following description of a preferred embodiment of the invention serves to explain the invention in more detail in conjunction with the attached drawings, in which FIG. 1 is a cut-off illustration of a cutter support comprising a cutting insert and a cam and FIG. 2 is a partial, cross-sectional view along line 2—2 in FIG. 1.

FIG. 1 shows a cutter support 1 in the form of a cut-off shaft 2 which is used in turning machines, in particular a turning lathe. A cut-off shaft 2 of this type serves to cut or trim a rotating workpiece clamped in a lathe chuck. The length of the shaft 2, which is cut off to the right in FIG. 1, is dependent on the diameter of the workpiece to be cut and may, for example, be 10 to 20 cm or more.

The cut-off shaft 2 is provided with two recesses communicating with one another, namely one substantially circular recess 3 and one substantially rectangular recess 4. A cam 5 is inserted into the first recess 3 and a cutting insert 6 for removing metal from a workpiece is inserted into the second recess 4. In addition, a pin 7 serving as clamping member is secured in the cut-off shaft 2 in a cantilever manner. The free end 8 of the pin is displaceable towards the cutting insert 6 when the cam 5 which acts as an eccentric is turned.

A substantially triangular clamping plate 41 is rigidly mounted on the free end 8 of the pin 7. One side 42 of the clamping plate engages the adjacent side 43 of the cutting insert 6. If the free end 8 of the clamping pin is moved towards the cutting insert 6 when the cam 5 is turned, the side 42 of the clamping plate 41 is pressed against the adjacent side 43 of the cutting insert 6 and so the cutting insert is firmly clamped in the cut-off shaft 2.

As shown in FIG. 1, the cam 5 is, in relation to the lower edge 44 of the cut-off shaft 2, substantially at the same height as the cutting insert 6. This enables the cut-off shaft 2 to have a narrower design than was previously the case and the shaft need not be superelevated in relation to the cutting insert. This flat or narrow design of the cut-off shaft 2 enables the cuttings produced by the cutting insert 6 to run off without difficulty over the free edge of the clamping plate 41.

As shown in FIG. 2, the adjacent sides 42 and 43 of the clamping plate 41 and the cutting insert 6, respectively, are designed to be complementary to one another (triangular) and engage one another positively and substantially without clearance. This means that, on the one hand, a good hold is guaranteed between clamping plate 41 and cutting insert 6 and, on the other hand, no cuttings may penetrate between clamping plate 41 and cutting insert 6 due to the lack of space between them.

In the preferred embodiment of the invention, the pin 7 and the clamping plate 41 are designed in one piece, advantageously as a precision casting.

As shown in FIG. 1, the cam 5 has a groove 9 of varying depth on its side facing the pin 7. The sides of the groove encompass the free end 8 of the pin 7 and so the cam 5, which has a circular-cylindrical surface 11 on its side remote from the groove 9, is rotatably held in the recess 3 and simultaneously prevented from falling out of the cut-off shaft 2. Since the groove 9 of the cam 5 is of a varying depth, the base of the groove engaging the free end 8 of the pin acts like an eccentric and so the clamping plate 41, which is rigidly connected to the free end 8 of the pin 7, clampingly engages the cutting insert 6 when the cam is turned. The cam 5 has in its centre a hexagonal, through channel 13 for insertion of a tool having a complementary shape and which serves to turn the cam in the cut-off shaft.

In the illustrated embodiment, the cutting insert 6 consists of two parts, namely a cutter member 15 bearing the actual cutting edge 14 and a cutter plate 16, to which the cutter member 15 is secured, for example soldered. The cutting insert 6 has wedge-shaped grooves 17, 18 on its opposite or narrow sides, as already mentioned. A projection of the cut-off shaft 2 which is tapered in the shape of a roof engages in the groove 17 and the side 43 of the clamping plate 41 which is also tapered in the shape of a roof engages in the groove 18 (FIG. 2). This means that the cutting insert 6 is held laterally, i.e. perpendicularly to the plane of drawing in FIG. 1, within the cut-off shaft 2 so as to be immovable. A corresponding positive connection may also be provided at the rearward or narrow side 45 of the cutting insert 6.

The pin 7 is inserted into a corresponding bore 24 in the cut-off shaft 2. At its lower end located in the cut-off shaft 2 the pin has a notch 25 which is engaged by a fastening means 26, for example a clamping sleeve, to secure the pin 7 axially in position in the cut-off shaft 2. The bore 24 widens beyond the line 27 illustrated in FIG. 7 and so, from this point on, the end 8 of the pin 7 is cantilevered.

An essential feature of the inventive arrangement is the fact that no obstruction, for example in the form of a transverse surface, hinders the flow of cuttings resulting at the edge 14, due to the "flat" design of the cut-off shaft 2. As shown in FIG. 1, the cutting edge 14 is practically at the same level as the upper edge of the cut-off shaft 2 and the free edge of the clamping plate 41 provides a more or less linear transition from the cutter member 15 to the upper edge of the cut-off shaft 2.

The cutter support 1 described in the aforesaid need not necessarily be designed as a rigid cut-off shaft 2. On the contrary, cutter supports of other types may be used, for example rotating band saw blades as well as rotating milling cutters and circular saw blades having more than one cutting insert 6, as described and illustrated, for example, in German laid-open application No. 33 19 799.

What is claimed is:

1. A device for clamping comprising:

a cutter support;

a recess in said support;

a cutting insert to be clamped in said recess of said support;

a cam rotatably mounted in said cutter support;

a clamping member mounted on the cutter support for pressing against said cutting insert in response to rotation of said cam, wherein said clamping member includes (1) a pin secured in a cantilevered manner in a bore of said cutter support such that the free end of said pin in displaceable transversely to its longitudinal axis towards said cutting insert by rotation of said cam, and (2) a clamping plate integral with said free end of said pin for engaging and securing the cutting insert in response to rotation of said cam;

said bore for receiving said pin having a tapered diameter such that said free end of said pin is not supported by the surface of said bore;

said cam comprising a generally cylindrical surface for rotating about its longitudinal axis, said cam including a grooved portion having a circumferential surface radius of varying magnitude and having sides that encompass the free end of said pin so that said cam is rotatably held in said cutter support;

said cam being situated at approximately the same height as that of said cutting insert relative to the lower surface of said cutter support; and said clamping plate having a free edge for providing a substantially linear transition from a cutting portion of said cutting insert to the upper edge of said cutter support, thereby insuring unhindered removal of chips flowing from said cutter member.

2. Device as defined in claim 1, characterized in that adjacent sides (42, 43) of the cutting insert (6) and the clamping plate (41) are designed to be complementary to one another and engage one another positively and substantially without clearance.

* * * * *